(12) United States Patent  
Roscoe

(10) Patent No.: US 6,460,677 B1
(45) Date of Patent: Oct. 8, 2002

(54) DUAL BALL RAMP ACTUATOR FOR LOCKING DIFFERENTIAL

(75) Inventor: Charles S. Roscoe, Fort Wayne, IN (US)

(73) Assignee: Spicer Technology, Inc., Fort Wayne, IN (US)

(*) Notice: Subject to any disclaimer, the term of this patent is extended or adjusted under 35 U.S.C. 154(b) by 0 days.

(21) Appl. No.: 09/722,521

(22) Filed: Nov. 28, 2000

(51) Int. Cl.[7] .................. F16H 48/22; F16D 27/115
(52) U.S. Cl. .................. 192/84.7; 192/84.93; 192/93 A; 475/150; 475/231
(58) Field of Search .................. 192/35, 40, 54.52, 192/70.23, 84.7, 84.91, 84.93, 93 A; 475/231, 150

(56) References Cited

U.S. PATENT DOCUMENTS

| | | | |
|---|---|---|---|
| 3,220,526 A | | 11/1965 | Gattiker, Jr. |
| 3,251,441 A | | 5/1966 | Winter |
| 3,829,147 A | | 8/1974 | Ryswick |
| 4,919,008 A | | 4/1990 | Goscenski, Jr. |
| 5,078,249 A | | 1/1992 | Botterill |
| 5,106,349 A | | 4/1992 | Botterill et al. |
| 5,505,285 A | * | 4/1996 | Organek .................. 192/35 |
| 5,651,437 A | | 7/1997 | Organek et al. |
| 5,713,446 A | * | 2/1998 | Organek et al. .............. 192/35 |
| 5,802,915 A | | 9/1998 | Organek et al. |
| 5,819,883 A | * | 10/1998 | Organek et al. ......... 192/70.23 |
| 5,931,272 A | | 8/1999 | Fukushima et al. |
| 5,966,999 A | * | 10/1999 | Showalter et al. ............ 74/650 |
| RE36,502 E | | 1/2000 | Organek et al. |
| 6,082,504 A | * | 7/2000 | Organek et al. .............. 192/35 |
| 6,083,134 A | * | 7/2000 | Godlew ...................... 475/231 |

* cited by examiner

Primary Examiner—Rodney H. Bonck
(74) Attorney, Agent, or Firm—Liniak, Berenato, Longacre & White

(57) ABSTRACT

A dual ball ramp actuator having a control ring acting with a pressure plates to supply an axial clutch clamping force to a differential clutch assembly where the ball ramp paths follow overlapping eccentric grooves that can be actuated in both the forward and reverse directions. The dual ramp feature doubles the effectiveness and sensitivity when compared to a single ramp system. The overlapping eccentric ball ramps increase (effectively double) the angular travel distance while reducing the ramp angle (in half). The forward and reverse feature provides clutch actuation in both the forward and reverse directions. The dual ramp, 3-piece sandwich construction permits the central control ring to roll up on two sets of balls on each side. This structure doubles the axial travel available to compress a disc pack and lock up the differential with the same ball ramp angle when compared to a single ramp system involving only two ramp plates.

10 Claims, 5 Drawing Sheets

DUAL BALL RAMP ACTUATOR FOR LOCKING DIFFERENTIAL

BACKGROUND OF THE INVENTION

1. Field of the Invention

The present invention relates to a vehicle differential clutch and more particularly, to a differential clutch where friction discs are selectively engaged using a ball ramp actuator where a one-way clutch is used to provide efficient and effective clutch activation.

2. Description of Related Art

Differential clutches commonly use a series of clutch plates actuated by manual, hydraulic or electrical systems to provide various conditions of open differentials, limited slip differentials or locked-up differentials.

Efforts to automate the operation of the clutch using electronics are currently underway. It is known to use an electromechanical or hydraulic actuator connected to the mechanical linkage to, in essence, replace the operator for more accurate clutch operation during slippery conditions. Using such an actuator, the mechanical linkage is moved in response to an electrical control signal generated by a central microprocessor used to process a variety of vehicle sensor inputs and other operating conditions to determine when and in what manner the differential clutch should be activated, or deactivated.

The use of a ball ramp actuator to load a clutch pack in a vehicle driveline differential is known from the prior art, including limited slip differentials where a clutch pack is loaded in response to the activation of a ball ramp actuator initiated by rotation of a servo motor or a solenoid driven brake shoe on an activating ring. The advantage of the ball ramp mechanism over other actuators is that it converts rotary motion into axial motion with very high force amplification, often 100:1 or greater. A ball ramp actuator has also been utilized in a vehicle transmission to engage and disengage gearsets by loading a gear clutch pack in response to a signal.

In both of these applications, one side of the ball ramp actuator, commonly called a control ring, reacts against case ground through the force induced by an electromagnetic field generated by a coil or is rotated by an electric motor relative to case ground. To generate greater clamping forces, the electrical current supplied to the coil or motor is increased thereby increasing the reaction of the control ring to case ground which rotates the control ring relative to an activation ring thereby causing rolling elements to engage ramps in the control and activation ring which increase the axial movement and clamping force on the clutch pack.

The ball ramp actuator comprises a plurality of roller elements, a control ring and an opposed activation ring where the activation ring and the control ring define at least three opposed single ramp surfaces formed as circumferential semi-circular grooves, each pair of opposed grooves containing one roller element. A plurality of thrust balls (or other type of thrust bearing) is interposed between the control ring and a housing member, rotating with and connected to the input member such as a flywheel. An electromagnetic coil is disposed adjacent to one element of a control clutch so as to induce a magnetic field that loads the control clutch which in turn applies a force on the control ring of the ball ramp actuator.

One problem with the use of a ball ramp actuator to supply the clutch clamping force is that the mechanics of prior art unidirectional ball ramp mechanisms result in a limited sensitivity due the short travel distance of the ball and ramp assembly due to limited space. Providing ramps at a constant radius or concentric cam path provides a limited travel path for the ball(s) and thereby limits sensitivity. In addition, the conventional ball ramp actuator uses a cam ramp that operates in only one direction (single ramp). However, a vehicle that is stuck may move forward and reverse to free itself, and torque reversal on the drive shaft and axle occurs and is expected in those situations. The single ramp arrangement cannot effectively transmit torque in both the forward and reverse directions without a one-way clutch or constant electric signal to maintain engagement.

In order for the single ramp arrangement to work, thrust bearings must be disposed on both sides of the 3-piece cam plate assembly that is nonrotatably attached to the differential, and this arrangement increases the expense.

The need exists for a differential clutch actuation system having improved sensitivity and improved cam ramp axial travel versus cam ramp angle while at the same time providing both forward and reverse actuation.

SUMMARY OF THE INVENTION

The invention provides for a ball ramp actuator for an electronically controlled clutch such as might be used in a motor vehicle, wherein a ball ramp actuator has forward and reverse angle ramps and improved sensitivity and cam ramp axial travel versus cam ramp angle.

The present invention is characterized by a differential clutch assembly coupled through a three-piece cam plate construction with dual-direction, overlapping ramps that allow twice the cam ramp travel distance while maintaining the cam angle. An electromagnetic coil is used to activate a control clutch, which frictionally couples the clutch discs. The ball ramp actuator provides a clamping force on the clutch friction discs whose amplitude immediately increases with the differential speed between the input and output shafts without complex electronic intervention using the coil.

A provision of the present invention is the use of a bi-directional cam plate construction that permits a vehicle that is stuck or slipping to move forward and reverse to obtain positive traction. In other words, the present invention operates when the torque reversal on the drive shaft and axle occurs.

Another provision of the present invention is to provide an interaxle application where input rotation can be clockwise or counterclockwise and there is limited space for a mechanism to engage the ball ramp.

Still another provision of the present invention is the elimination of one-way clutches, thrust bearings and gear reduction assemblies.

These and other benefits of the present invention will become more apparent with reference to the following drawings and associated description.

DETAILED DESCRIPTION OR THE PREFERRED EMBODIMENT

Figure 1:
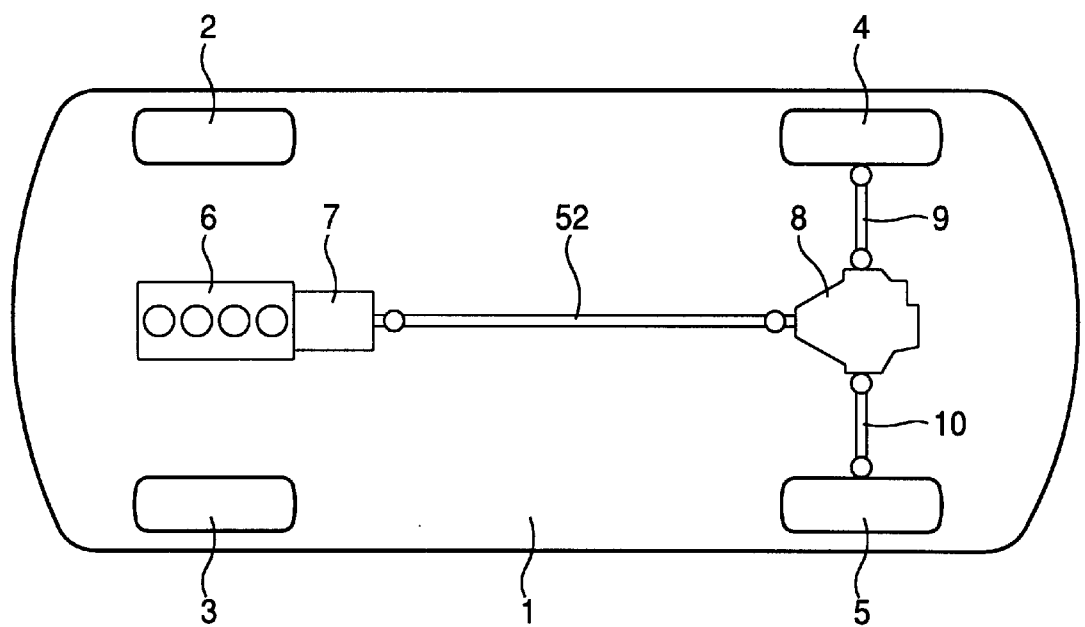
FIG. 1 is a schematic showing the driveline arrangement of a rear wheel drive vehicle.

Referring now to FIG. 1 of the drawings, illustrated is in diagrammatic plan view a rear wheel drive motor vehicle 1, comprising front wheels 2, 3; rear wheels 4, 5; an engine 6; gearbox 7; a differential unit 8, and drive shafts 9, 10. In this case, however, there is a propeller shaft 52 leading from the gearbox 7 to the differential unit 8 which is of course rear mounted to drive the rear wheels.

Figure 2:
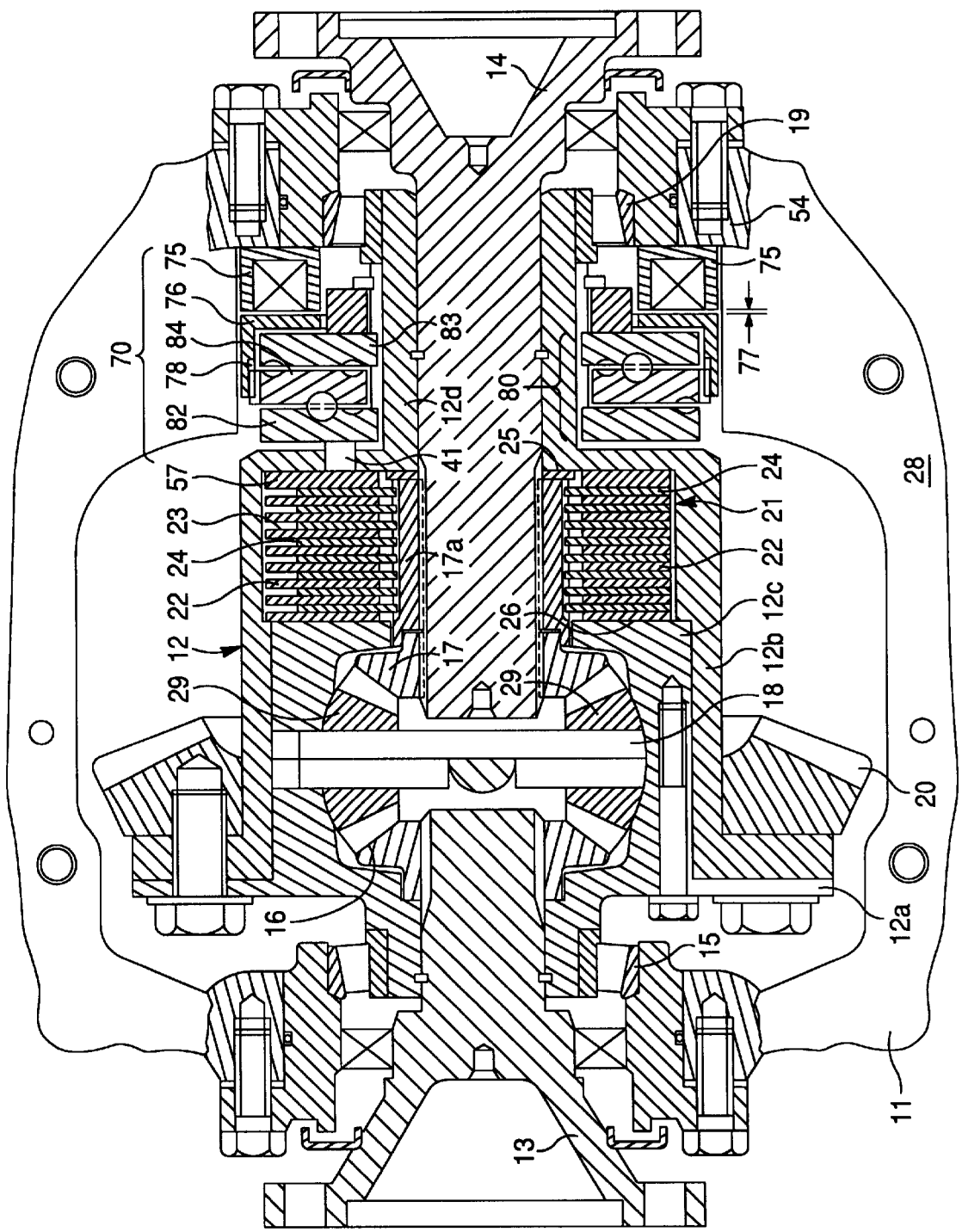
FIG. 2 is a part section through a differential unit incorporating the ball ramp actuation system of this invention.
Figure 3:
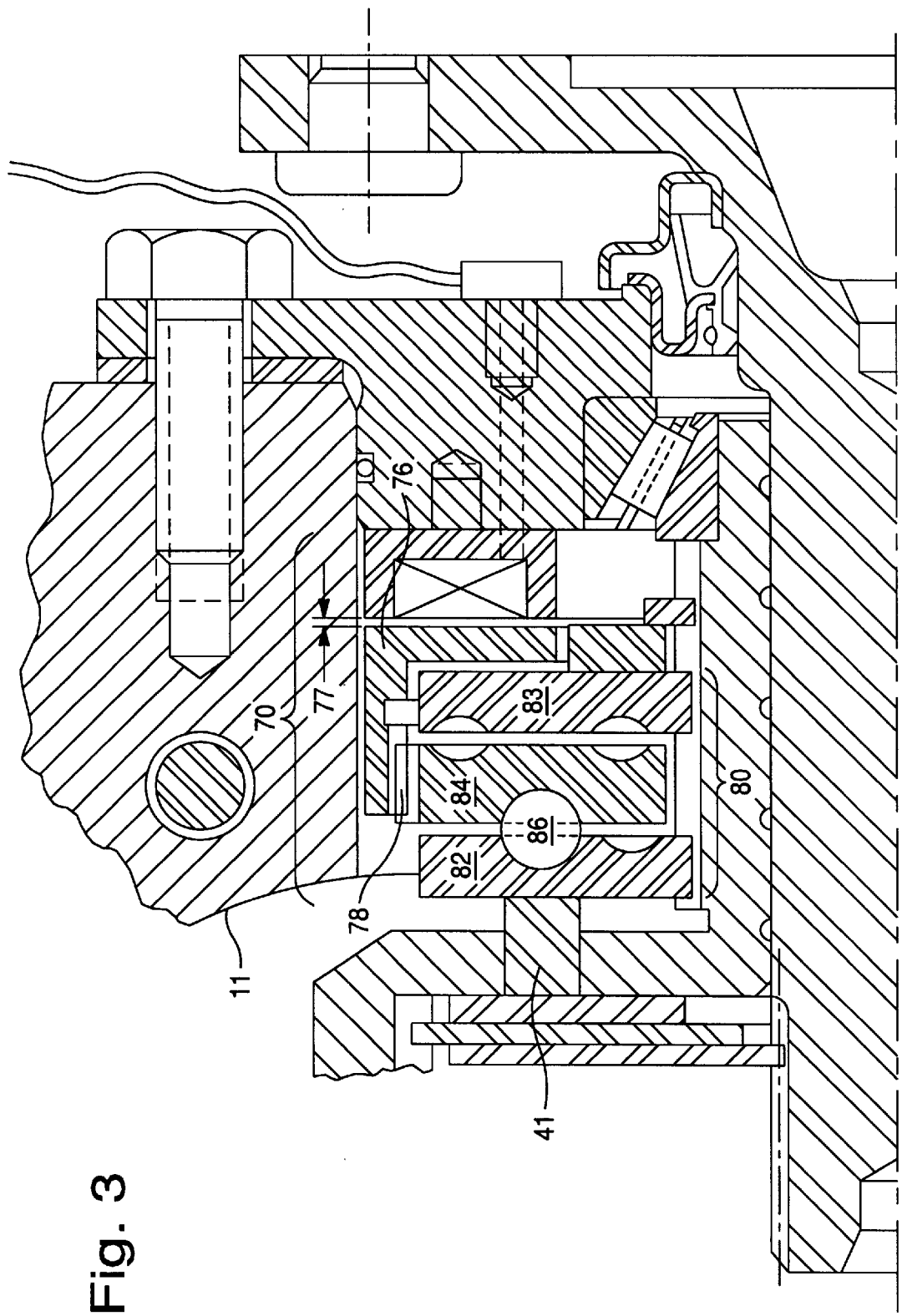
FIG. 3 is an enlarged view of the ball ramp actuation system shown in FIG. 2.

The differential unit shown in FIG. 2 comprises a housing 11 within which there is rotatably supported, by bearings 15, 19, a differential case 12. The differential case 12 has a flange to which is bolted a ring gear 20 to be engaged by a driving pinion (not shown) rotatable about an axis perpendicular to the axis of rotation of the case 12.

By way of example and explanation, the case 12 comprises three components 12a, 12b, and 12c. The component 12b is generally cup-shaped, whilst the component 12a secured to the component 12b (by the bolts which hold the ring gear 20) closes the open end of the component 12b. Component 12c fits within the component 12b being secured to the closure part 12a by further bolts. The parts 12a, 12c support two transversely extending pins at right angles to one another, one of which is indicated at 18. The pins support bevel pinion gears 29, which mesh with bevel side gears 16, 17 which form the output elements of the differential unit. The side gears 16, 17 are connected to output shafts 13, 14 provided with drive flanges for connection to the drive shafts 9, 10.

A friction assembly 21 is disposed in the differential case, comprising interleaved friction plates 22, 24 of which the plates 22 are rotationally fast with the case part 12b having toothed engagement therewith at the outer periphery of the plates 23, whilst the plates 24 are rotationally fast with the output element 17 and output shaft 14, having toothed engagement at the inner periphery of the plates with a sleeve 17a splined to the output shaft 14. An end one of the plates 22 abuts a surface 26 on the case part 12c, whilst the opposite end one of the plates 24 abuts a pressure plate 57. Tappets 41 extend through the case part 12b to abut a pressure plate 82 which is part of the ball ramp actuator assembly 70.

The ball ramp actuator assembly 70 consists primarily of the coil 75 and the ball ramp actuator 80 of which a pressure plate 82 (also known as an activation ring) is used to supply axial force to the clutch plates 22, 24 when acted upon by a control ring 84. The arrangement of this invention consists of a pair of pressure plates 82, 83 which sandwich the control ring 84.

Figure 4:
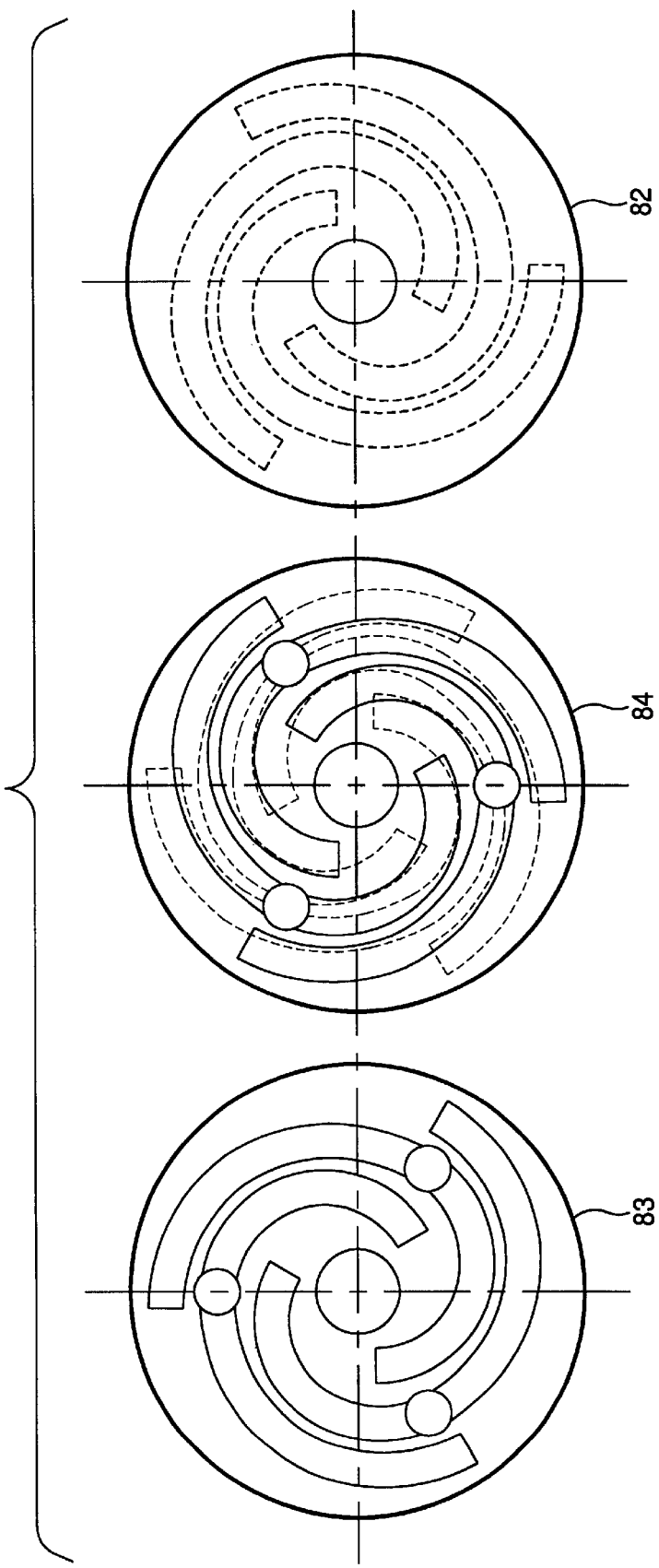
FIG. 4 is an exploded view separately showing the activation ring, control ring and pressure plate of the ball ramp actuator of the present invention.
Figure 5:
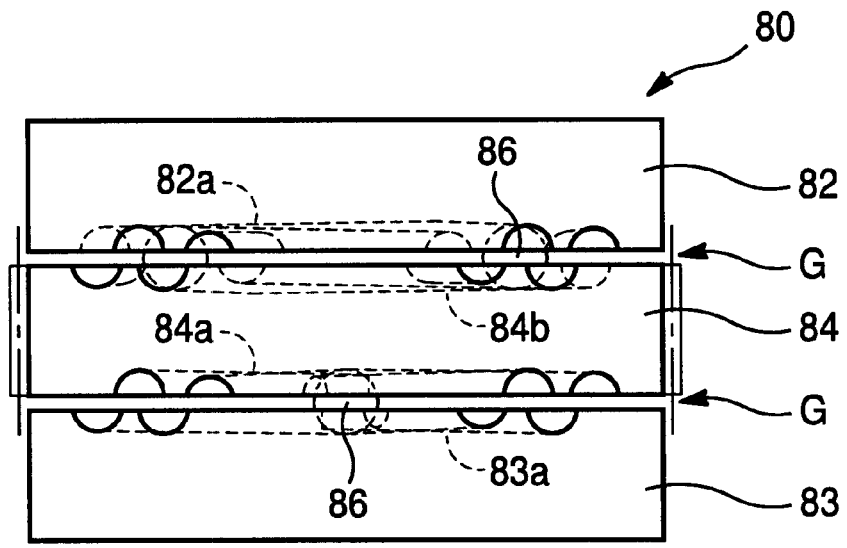
FIG. 5 is a sectional view of FIG. 4 taken along line V—V of FIG. 4 of the ball ramp actuator of the present invention with the actuator in a non-energized state and the control ring between the pressure plates.
Figure 6:
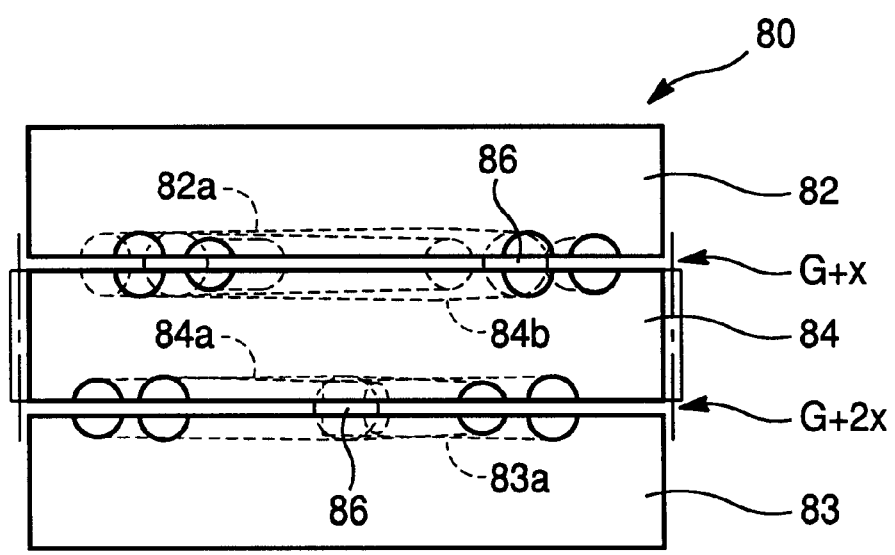
FIG. 6 is a sectional view of FIG. 4 taken along line V—V of FIG. 4 of the ball ramp actuator of the present invention with the actuator in an energized state and the control ring between the pressure plates.

Relative rotation between the control ring 84 and the first and second pressure plates 82, 83 causes a plurality of rolling members 86 to move along the overlapping grooves 82a, 83a (see FIGS. 4–6). The plate grooves 82a formed in a face of the first pressure plate 82 oppose corresponding ring grooves 84a in the control ring 84, and plate groove 83a formed in a face of the second pressure plate 83 oppose corresponding ring grooves 84b in the control ring. Ring grooves 84a are on an oppose face of the control ring 84 compared to ring grooves 84b that face the second pressure plate 83. The second pressure plate 83 is fixed in place, keyed to the case at 12d, and the first pressure plate 82 is adapted to translate along a direction toward and away from the tappets 41, also keyed to the case at 12d. Likewise, the control ring 84 is adapted to translate axially relative to the second pressure plate 83. Thus, relative rotation of the control ring 84 and the pressure plates 82, 83 cause the rolling members 86 to traverse their respective plate grooves 82a, 83a, thereby causing the control ring 84 to axially move relative to the second pressure plate 83. The first pressure plate 82 and the second pressure plate 83 are axially moveable and rotationally coupled to the hub on the case part 12d of the case 12.

Thus, as the ball ramp actuator 80 expands to axially displace the pressure plate 82, the force reacts through the tappets 41 and ultimately to the clutch plates 22, 24.

Relative rotation of the control ring 84 may be accomplished by a number of actuation devices. In the preferred embodiment, the control ring 84 magnetically interacts with the control coil 75 mounted adjacent the control ring 84, e.g., to the stationary differential housing 11, such that when electrical current is supplied to the control coil 75 by the control unit (not shown), the control ring 84 is selectively rotated relative in one of a clockwise and counterclockwise direction about the axis of the shafts 13, 14. The control ring 84 rotates with the differential sandwiched between the two pressure plates. When the coil 75 is activated, rotation of the ring 84 is retarded, causing the relative rotation with respect to the plates 82 and 83. A floating flux plate 76 is keyed to the control ring 84 at 78. The energized coil attracts the flux plate into frictional contact 77 increasing the holding capacity. This results in improved action creating the relative rotation between the control ring 84 and the pressure plates 82, 83, while allowing the control ring 84 to move axially away from the coil 75.

Referring now to FIG. 4, the control ring 84 is shaped in a disc configuration with a plurality of overlapping circumferentially extending ring grooves 84a formed on one side and a plurality of overlapping radial ring grooves 84b formed on the other side therein. Ring grooves 84a contain rolling members 86. In a similar manner, the pressure plates 82, 83 contain alike number and orientation of overlapping circumferentially extending plate grooves 82a opposing the ring grooves 84a on one side and plate grooves 83a opposing the ring grooves 84b on the other side formed in the control ring 84.

Upon relative rotation of the control ring 84 and the pressure plates 82, 83, the spherical elements 86 roll in the control ring grooves 84a, 84b and pressure plate grooves 82a, 83a, where the grooves provide for axial movement that tends to separate the control ring 84 and the pressure plates 82, 83.

The motion of the control ring 84 and pressure plates 82, 83 is more clearly shown in FIGS. 5 and 6 and reference thereto will now be made. FIGS. 5 and 6 are sectional views of FIG. 2 taken along line V—V of the control ring 84 and the pressure plates 82, 83 of the present invention. FIG. 5 shows the ball ramp mechanism 80 in a non-energized state where the spherical elements 86 are located at the deepest portion of the control ring grooves 84a, 84b and the deepest portion of the pressure plate grooves 82a, 83a thereby establishing a relatively narrow separation gap 'G'. After rotation of the control ring 84 relative to the pressure plates 82, 83 to the energized state shown in FIG. 6, the separation gap 'G' is increased by an amount 'x' between the pressure plate 83 and control ring 84 and by an amount '2x' between the pressure plate 82 and the control ring 84. This axial movement is used to axially move the pressure plate 82 toward the tappets 41 thereby supplying a clamping force on the clutch discs 22, 24.

According to the present invention, once the clutch assembly 21 is engaged by action of the ball ramp actuator 70, the clutch assembly can evenly distribute torque to the vehicle axles 13, 14 thereby propelling the vehicle even on slippery surfaces.

From the foregoing description, it is evident that the invention provides for a ball ramp actuator for an electronically controlled clutch such as might be used in a motor vehicle, wherein a ball ramp actuator has forward and reverse angle ramps and improved sensitivity and cam ramp axial travel versus cam ramp angle.

More specifically, a differential clutch assembly is coupled through a three-piece cam plate construction with dual-direction, overlapping ramps that allow twice the cam ramp travel distance while maintaining the cam angle. An electromagnetic coil is used to activate a control clutch, which frictionally couples the clutch discs. The ball ramp actuator provides a clamping force on the clutch friction discs whose amplitude immediately increases with the differential speed between the input and output shafts without complex electronic intervention using the coil.

Use of a bidirectional cam plate construction permits a vehicle that is stuck or slipping to move forward and reverse to obtain positive traction. In other words, the present invention operates when the torque reversal on the drive shaft and axle occurs. Therefore, in an interaxle application, input rotation can be clockwise or counterclockwise even where there is limited space for a mechanism to engage the ball ramp. The present invention also eliminates the one-way clutches or gear reduction assemblies required by the prior art.

The present invention also eliminates the thrust bearings required in the prior art because the two outer pressure plates are keyed to and rotate with the differential.

This invention has been described in great detail, sufficient to enable one skilled in the art to make and use the same. Various alterations and modifications of the invention will occur to those skilled in the art upon the reading and understanding of the foregoing specification, and it is intended to include all such alterations and modifications as part of the invention, insofar as they come within the scope of the intended claims.

I claim:

1. A ball ramp mechanism for coupling two rotating elements comprising:
    an input element driven by a prime mover and rotating about an axis of rotation;
    an output element for rotating an output device;
    a clutch mechanism for delivering torque from said input element to said output element;
    a ball ramp actuator for actuating said clutch mechanism, said actuator comprising a control ring, a first pressure plate, a second pressure plate, a plurality of rolling elements interposed between said control ring and said first and second pressure plates, and a control device for rotating said control ring relative to said first and second pressure plates,
    said first and second pressure plates are disposed on an outer diameter of a differential case housing a differential assembly,
    said second pressure plate having at least two circumferential plate grooves formed therein;
    said control ring being disposed between said first and second pressure plates, first and second opposite faces of said control ring having at least two circumferential control ramps formed therein, said second opposite face facing said at least two circumferential plate grooves formed in said second pressure plate, said control ring adapted to rotate and translate with respect to said second pressure plate;
    said first pressure plate having at least two additional circumferential plate grooves formed therein, said addition circumferential plate grooves facing said first opposite face of said control ring; said first pressure plate adapted to non-rotatably translate with respect to said second pressure plate,
    wherein each of said circumferential plate grooves, said circumferential control ramps and said additional circumferential plate grooves being disposed in an overlapping manner to effectively lengthen a travel distance of said rolling elements, and wherein each of said circumferential plate grooves, said circumferential control ramps and said additional circumferential plate grooves define a maximum depth at an approximate midpoint thereof to provide a bi-directional forward and reverse clutch actuation assembly.

2. The ball ramp mechanism of claim 1, wherein said first pressure plate and said control ring translate with respect to said second pressure plate upon relative rotation of said control ring in both a clockwise direction and a counterclockwise direction.

3. The ball ramp mechanism of claim 1, wherein a total travel distance provided by said circumferential grooves provided on each of said control ring, said first pressure plate and said second pressure plate is greater than 360 degrees.

4. The ball ramp mechanism of claim 1, wherein said control device comprises an energizing coil for creating a magnetic field adjacent said control ring to thereby causes relative rotation of said control ring.

5. The ball ramp mechanism of claim 4, wherein said coil is attached to one of a differential housing and a differential case.

6. The ball ramp mechanism of claim 1, wherein said rolling elements are spherically shaped.

7. The ball ramp mechanism of claim 1, wherein said control device has a magnetic section disposed to cause relative rotation of said control ring upon energization of said coil.

8. The ball ramp mechanism of claim 1, wherein said control ring is keyed to a flux plate that is axially moveable but rotatably attached to said control ring to thereby frictionally contact a face of said energizing coil while permitting said control ring to move axially with respect to said energizing coil during relative rotation.

9. The ball ramp mechanism of claim 1, wherein said first and second pressure plates circumscribe an outer diameter of a differential case housing a differential assembly.

10. The ball ramp mechanism of claim 1, wherein said first and second pressure plates are keyed onto said outer diameter to thereby act as bearing members, whereby separate bearing are eliminated from the mechanism to reduce cost.

* * * * *